United States Patent
Sarkar et al.

(10) Patent No.: US 12,547,418 B2
(45) Date of Patent: *Feb. 10, 2026

(54) BOOT PROCESSES FOR STORAGE SYSTEMS

(71) Applicant: Micron Technology, Inc., Boise, ID (US)

(72) Inventors: Sourin Sarkar, Bangalore (IN); Vamshikrishna Komuravelli, Rangareddy (IN); Kanika Mittal, Agra (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,523

(22) Filed: Jun. 10, 2024

(65) Prior Publication Data

US 2024/0330009 A1    Oct. 3, 2024

Related U.S. Application Data

(63) Continuation of application No. 17/661,983, filed on May 4, 2022, now Pat. No. 12,014,187.

(51) Int. Cl.
*G06F 9/4401* (2018.01)

(52) U.S. Cl.
CPC .......... *G06F 9/4411* (2013.01); *G06F 9/4418* (2013.01)

(58) Field of Classification Search
CPC ............................. G06F 9/4411; G06F 9/4418
See application file for complete search history.

(56) References Cited

U.S. PATENT DOCUMENTS

| | | | |
|---|---|---|---|
| 7,340,638 B2 | 3/2008 | Nicholson et al. | |
| 8,254,568 B2* | 8/2012 | Smith | G06F 21/575 |
| | | | 713/1 |
| 10,496,307 B1 | 12/2019 | Peros et al. | |
| 11,194,586 B2 | 12/2021 | Lewis | |
| 11,635,971 B2* | 4/2023 | Amin | G06F 9/4406 |
| | | | 713/2 |
| 11,669,337 B2 | 6/2023 | Bilal et al. | |
| 12,147,815 B2* | 11/2024 | Sayyed | G06F 8/77 |
| 2003/0005277 A1 | 1/2003 | Harding et al. | |
| 2004/0153724 A1* | 8/2004 | Nicholson | G06F 11/0709 |
| | | | 714/E11.133 |
| 2007/0055860 A1 | 3/2007 | Wang | |
| 2007/0150651 A1 | 6/2007 | Nemiroff et al. | |
| 2007/0157015 A1* | 7/2007 | Swanson | G06F 9/4401 |
| | | | 713/2 |

(Continued)

*Primary Examiner* — Aurel Prifti
(74) *Attorney, Agent, or Firm* — Harrity & Harrity, LLP

(57) ABSTRACT

Implementations described herein relate to boot processes for memory devices. In some implementations, a controller of a storage system receives a command for enabling a fast bootup process for the storage system. The fast bootup process may exclude a measurement of information retrieved from a memory device of the storage system during the fast bootup process. The controller may enable the fast bootup process based on the command. The controller may disable a normal bootup process for the storage system based on the fast bootup process being enabled. The normal bootup process may include a measurement of information retrieved from the memory device during the normal bootup process.

19 Claims, 15 Drawing Sheets

(56) References Cited

U.S. PATENT DOCUMENTS

| | | | |
|---|---|---|---|
| 2007/0192581 A1* | 8/2007 | Challener | G06F 9/4408 |
| | | | 713/2 |
| 2008/0168299 A1* | 7/2008 | Kateley | G06F 11/1417 |
| | | | 714/2 |
| 2010/0217963 A1 | 8/2010 | Peterson | |
| 2011/0154484 A1* | 6/2011 | Shimabe | G06F 21/575 |
| | | | 726/19 |
| 2011/0161646 A1 | 6/2011 | Yu et al. | |
| 2012/0166780 A1 | 6/2012 | Ziarnik et al. | |
| 2012/0239918 A1 | 9/2012 | Huang | |
| 2012/0260082 A1* | 10/2012 | Bobzin | G06F 21/572 |
| | | | 713/100 |
| 2013/0042098 A1* | 2/2013 | Baik | G06F 9/445 |
| | | | 713/2 |
| 2013/0159690 A1* | 6/2013 | Tsukamoto | G06F 9/4401 |
| | | | 713/2 |
| 2014/0087675 A1 | 3/2014 | Pedersen et al. | |
| 2015/0074387 A1 | 3/2015 | Lewis | |
| 2017/0185782 A1* | 6/2017 | Furuya | G06F 21/32 |
| 2018/0203705 A1* | 7/2018 | Cooper | G06F 9/4411 |
| 2020/0034155 A1* | 1/2020 | Bilal | G06F 9/4416 |
| 2021/0334111 A1* | 10/2021 | Limonciello | G06F 9/4406 |
| 2021/0367781 A1 | 11/2021 | Wu et al. | |
| 2022/0318392 A1 | 10/2022 | Albesa et al. | |
| 2023/0110377 A1* | 4/2023 | Huo | G06F 9/4401 |
| | | | 711/154 |
| 2023/0115615 A1* | 4/2023 | Kalimuthu | G06F 1/10 |
| | | | 714/731 |
| 2023/0236840 A1* | 7/2023 | Widjaja Yu | G06F 9/4411 |
| | | | 713/1 |
| 2023/0359466 A1 | 11/2023 | Sarkar et al. | |

\* cited by examiner

BOOT PROCESSES FOR STORAGE SYSTEMS

RELATED APPLICATION

This application is a continuation of U.S. patent application Ser. No. 17/661,983, filed May 4, 2022 (now U.S. Pat. No. 12,014,187), which is incorporated herein by reference in its entirety.

TECHNICAL FIELD

The present disclosure generally relates to storage systems and, for example, boot processes for storage systems.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and a semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
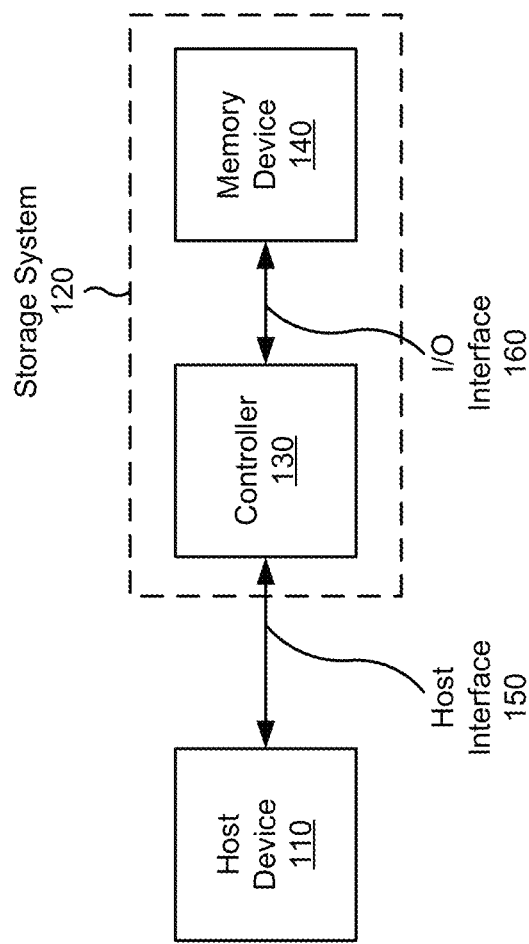
FIG. 1 is a diagram illustrating an example system capable of enabling and disabling boot processes for storage systems.

A computer system, such as an embedded system, may store information in a memory device (e.g., a non-volatile memory). The information may be firmware, software, an operating system, application code, and/or data. During a bootup process, which may occur after the computer system is turned on (e.g., based on a power cycling of the computer system), the information may be loaded from the memory device and executed by a host processor of the computing system. The information may be served to the host processor for execution during the bootup process. After the bootup process is completed, an application may be executed by the computer system. The information may be executed in a trusted execution environment, in which the information may be protected with respect to confidentiality and integrity. The trusted execution environment may provide an execution space that provides a relatively high level of security for the application that is executed on the computer system.

Typically, during the bootup process, the information loaded from the memory device may be subjected to a security check. During the bootup process, the information may be verified or measured against expected values (e.g., previously stored reference measurements) for integrity purposes. The reference measurements may be Golden measurements. When the information corresponds to the expected values (e.g., matches or is substantially similar to, within a tolerance threshold), the bootup process may continue. When the information does not correspond to the expected values (e.g., does not match or is not substantially similar to, outside of a tolerance threshold), this may indicate that the information has been modified in relation to a baseline version of the information, and the bootup process may or may not continue. For example, when the information does not correspond to the expected values, a notification may be provided (e.g., to the host device) indicating that potentially harmful changes have been made to the information, but the bootup process may still continue. Alternatively, the bootup process may be halted. The verification (or measurement) may be an auto-verification, in that the information may be automatically verified and may not need to be manually selected during the bootup process.

During the bootup process, the verification of the information may result in a boot time latency. The boot time latency may depend on a complexity of the application. For example, a simple application (e.g., a music player application) may be relatively small in size, so the information may be verified and served to the host processor in a relatively fast amount of time. As another example, a complex application (e.g., an aircraft operating system) may be relatively large in size, so a relatively large amount of time may be needed to verify the information and then serve the information to the host processor. The boot latency may be in the range of nanoseconds to milliseconds depending on the complexity of the application.

One problem is that the information stored in the memory device is not often modified, but the information may still be verified at each bootup process, thereby causing the boot latency. The boot latency may occur at each bootup process (e.g., every power cycle of the computer system). Typically, changes made to the information may be relatively rare in relation to the number of boot cycles run by the computer system over a lifetime of the computer system. As a result, performing a full version of the bootup process (e.g., a full verification of the information) may be a waste of resources because changes made to the information since a previous bootup process may be unlikely.

In some implementations, to reduce the boot latency of the bootup process associated with a storage system, a controller of the storage system may initially implement a normal bootup process for the storage system based on an initial factory configuration of the storage system. The normal bootup process may include a verification of information retrieved from a memory device of the storage system during the normal bootup process. At a later point in time, the controller may receive, based on a user input, a command for enabling a fast bootup process for the storage system. The fast bootup process may exclude a verification of information retrieved from the memory device during the fast bootup process. The controller may enable the fast bootup process based on the command. The controller may disable the normal bootup process based on the command and/or based on the fast bootup process being enabled. When the fast bootup process is enabled, the controller may detect that the storage system has been powered on (e.g., based on a power cycling of the storage system). The controller may perform the fast bootup process based on the storage system being powered on.

In some implementations, the controller may determine whether to perform the fast bootup process in lieu of the normal bootup process based on the user input. The user input may be provided by a user of the storage system (e.g., via an input device that is included in or that communicates with the host device). When the storage system is used in a secure environment and the information stored on the storage system is typically not modified, the storage system may receive the user input indicating that the normal bootup process should be disabled and that the fast bootup process should be enabled. Otherwise, the controller may not receive the user input, and the controller may keep the initial factory configuration (e.g., keep the normal bootup process) and not enable the fast bootup process.

In some implementations, the fast bootup process may have a lower boot latency as compared to the normal bootup process because the information is not verified during the fast bootup process and the information is verified during the normal bootup process. The fast bootup process may consume fewer resources as compared to the normal bootup process because the information is not verified during the fast bootup process and the information is verified during the normal bootup process. The fast bootup process may be a less secure bootup process because the information is not verified, and the normal bootup process may be a more secure bootup process because the information is verified. However, due to the storage system being used in the secure environment and the information stored on the storage system being less likely to be modified, the less security associated with the fast bootup process may be justified by the faster bootup time associated with the fast bootup process.

FIG. 1 is a diagram illustrating an example system 100 capable of enabling and disabling boot processes for storage systems. The system 100 may include one or more devices, apparatuses, and/or components for performing operations described herein (e.g., for enabling and disabling boot processes for a storage system 120). For example, the system 100 may include a host device 110 and the storage system 120. The storage system 120 may include a controller 130 and a memory device 140. The host device 110 may communicate with the storage system 120 (e.g., the controller 130 of the storage system 120) via a host interface 150. The controller 130 and the memory device 140 may communicate via an input/output (I/O) interface 160.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory device 140. For example, the host device 110 may include a central processing unit (CPU), a graphics processing unit (GPU), a field-programmable gate array (FPGA), an application-specific integrated circuit (ASIC), and/or a controller.

The storage system 120 may be any electronic device configured to store data in memory. In some implementations, the storage system 120 may be an electronic device configured to store data persistently in non-volatile memory. For example, the storage system 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, and/or an embedded multimedia card (eMMC) device.

The controller 130 may be any device configured to communicate with the host device (e.g., via the host interface 150) and the memory device 140 (e.g., via the I/O interface 160) and/or configured to control operations of the storage system 120. For example, the controller 130 may include an ASIC, an FPGA, a processor, and/or a controller.

The memory device 140 may be a non-volatile memory device configured to maintain data stored in memory after the memory device 140 is powered off (e.g., configured for persistent data storage). In some implementations, the memory device 140 is a NAND memory device. Although some techniques are described herein in connection with NAND memory devices, in some implementations, one or more of these techniques may be performed in connection with other types of non-volatile memory devices, such as NOR memory devices.

The controller 130 may transmit a command to the memory device 140 based on an instruction received from the host device 110. The command may be, for example, a read command, a write command (sometimes called a program command), or an erase command. Additionally, or alternatively, the command may indicate the data to be read, written, or erased, and/or may indicate a location (e.g., in memory) for the data to be read, written, or erased. The memory device 140 may process and/or perform the command.

In some implementations, the controller 130 may receive, from the host device 110 and based on a user input, a command for enabling a fast bootup process for the storage system 120. The fast bootup process may exclude a verification of information retrieved from the memory device 140 during the fast bootup process. In other words, during the fast bootup process, the controller 130 may not verify or measure the information against expected values (e.g., previously stored reference measurements). The controller 130 may enable the fast bootup process based on the command. The command may be an authenticated command (e.g., a signed vendor command). The controller 130 may disable a normal bootup process for the storage system 120 based on the command and/or based on the fast bootup process being enabled. The normal bootup process may be a default configuration of the storage system 120. The normal bootup process may include a verification of information retrieved from the memory device 140 during the normal bootup process. In other words, during the normal bootup process, the controller 130 may verify or measure the information against expected values. The controller 130 may detect that the storage system 120 has been powered on. For example, the controller 130 may detect a power cycling of the storage system 120, which may result in the storage system 120 being powered on. The controller 130 may perform the fast bootup process based on the storage system 120 being powered on. The fast bootup process may have a lower boot latency and consume fewer resources as compared to the normal bootup process because the fast bootup excludes the verification of information whereas the normal bootup process includes the verification of information.

In some implementations, the user of the storage system be able to select a type of bootup process for the storage system (e.g., fast bootup process or normal bootup process) based on the environment and/or usage associated with the storage system. The user may be able to determine whether the bootup of the storage system should undergo a longer bootup latency or a shorter bootup latency, depending on the environment and/or usage associated with the storage system. Further, security may not be compromised because selecting the type of bootup process (e.g., a boot customization) may be based on authenticated commands.

As indicated above, FIG. 1 is provided as an example. Other examples may differ from what is described with regard to FIG. 1.

Figure 2A:
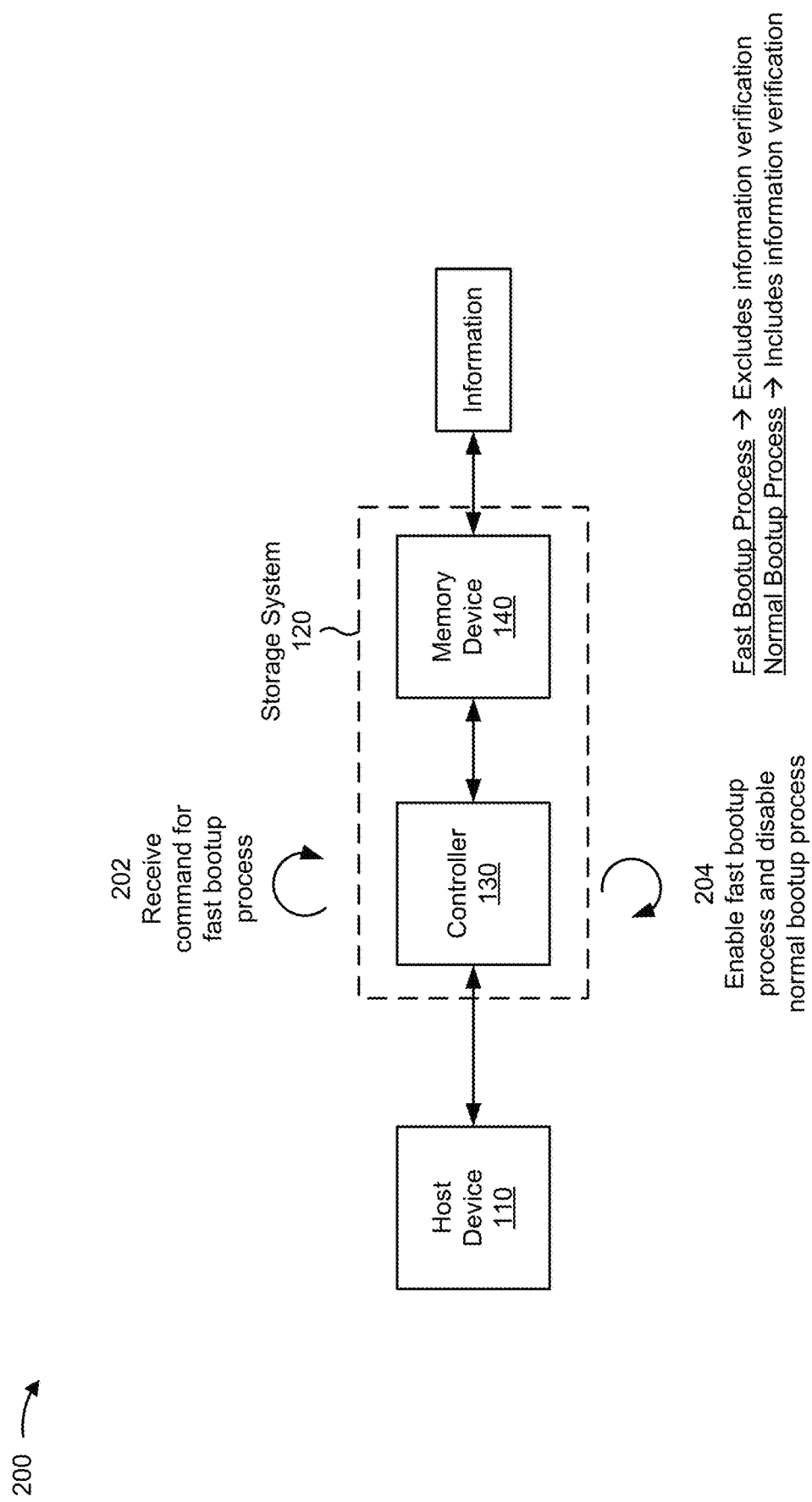
FIGS. 2A-2B are diagrams illustrating an example of boot processes for storage systems.
Figure 2B:
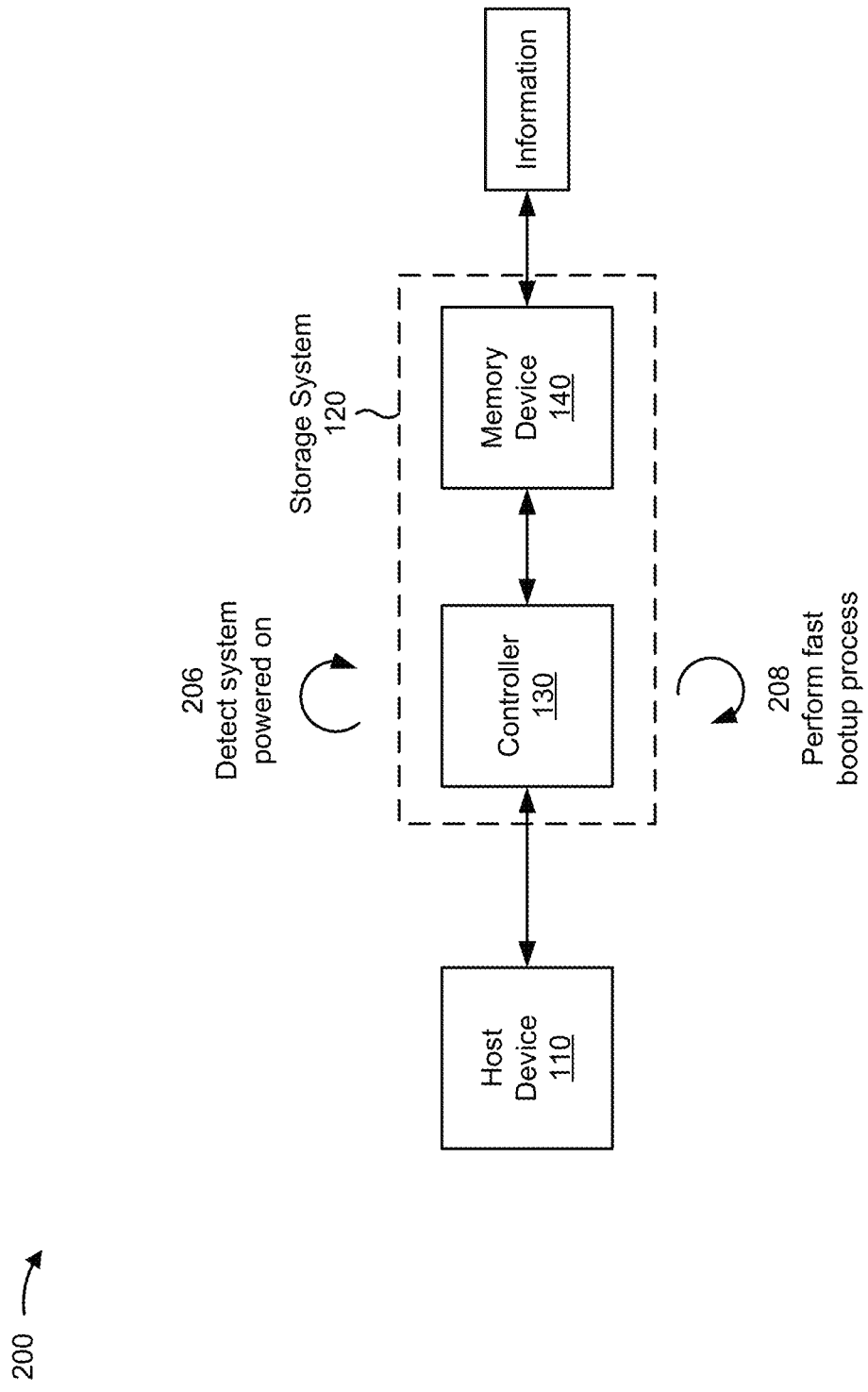

FIGS. 2A-2B are diagrams illustrating an example 200 of boot processes for a storage system. As shown, the storage system may be storage system 120, as described above in connection with FIG. 1. The storage system may include a controller (e.g., controller 130) and a memory device (e.g., memory device 140). The storage system may communicate with a host device. The host device may be host device 110, as described above in connection with FIG. 1.

In some implementations, the storage system may support both a fast boot process and a normal boot process. The fast bootup process may be a first bootup process. The normal bootup process may be a second bootup process that is different from the first bootup process. The fast bootup process may exclude a verification of information retrieved from the memory device during the fast bootup process. The information may include firmware, software, an operating system, application code, and/or data. The fast bootup process may involve not verifying or not measuring the information against expected values (e.g., previously stored reference measurements).

In some implementations, "information," as used herein, refers to information stored in the memory device that is loaded from the memory device during a bootup process. The information may be bootup information, which may be executed by the host device during the bootup process. The information may be served to the host device during the bootup process for execution and/or use of the information. The information may include firmware, software, an operating system, application code, and/or data. The information may include boot data, a build number, and/or reference measurements (or verification information). The reference measurements may be measurements associated with the information, which may be used during the verification of the information.

The normal bootup process may include a verification of information retrieved from the memory device during the fast bootup process. The normal bootup process may involve verifying or measuring the information against expected values (e.g., previously stored reference measurements). For example, a cryptographic hash function may be applied to the information to obtain one or more hash values, and the one or more hash values may be compared against one or more expected values, where an expected value may be a hash value derived from a baseline version of information stored on the memory device. The expected values may be stored in the memory device. The baseline version of information may change when the information changes (e.g., due to a firmware upgrade), in which case one or more expected values corresponding to the baseline version of information may become updated as well. A verification or measurement of the information against the expected values may be for determining an integrity of the information loaded from the memory device during the normal bootup process.

In some implementations, the fast bootup process may have a lower boot latency as compared to the normal bootup process because the information is not verified during the fast bootup process and the information is verified during the normal bootup process. The fast bootup process may consume fewer resources as compared to the normal bootup process because the information is not verified during the fast bootup process and the information is verified during the normal bootup process. However, the fast bootup process may be a less secure bootup process because the information is not verified, and the normal bootup process may be a more secure bootup process because the information is verified. Depending on a usage and/or environment associated with the storage system, the fast bootup process or the normal bootup process may be preferred. For example, when the storage system operates in a secure environment and/or an environment in which information stored on the storage system is unlikely to be modified (e.g., a boot region of the memory device is trustable), the lower security associated with the fast bootup process may be justified by the faster bootup time associated with the fast bootup process. On the other hand, when the storage system operates in an insecure environment and/or an environment in which information stored on the storage system is more likely to be modified, the slower bootup time associated with the normal bootup process may be justified by the additional security provided by the normal bootup process.

In some implementations, the storage system may implement the normal bootup process based on an initial factory configuration of the storage system. The initial factory configuration may disable the fast bootup process and enable the normal bootup process. In the initial factory configuration, a fast boot flag stored in the memory device may be set to a first value indicating that the fast boot process is disabled, such as a value of "0" or "DISABLED." The fast boot flag may be associated with fast boot information stored in the memory device. The normal bootup process may be a default setting of the storage system. During the normal bootup process, the controller may compare the information with the expected values, and when the information corresponds to the expected values, the controller may continue a bootup of the storage system. When the information does not correspond to the expected values, the controller may halt the bootup of the storage system, or the controller may continue the bootup of the storage system but may provide a warning indication to the host device. The warning indication may indicate that the bootup of the storage system may potentially be compromised.

As shown by FIG. 2A, and by reference number 202, the controller may receive, from the host device, a command for enabling the fast bootup process for the storage system. The controller may receive the command based on a user input, where the command may instruct the controller to enable the fast bootup process in lieu of the normal bootup process. The host device may receive, via a user interface, the user input, which may indicate that the fast bootup process should be enabled. For example, the user interface may provide an option for enabling the fast bootup process and/or for disabling the normal bootup process. The user input may indicate a selection to enable the fast bootup process and/or to disable the normal bootup process. The host device may generate the command based on the user input received via the user interface, and the host device may provide the command to the storage system.

In some implementations, the command may be an authenticated command, such as a signed vendor command, which may ensure an authenticity of the command. In other words, the authenticated command may ensure to the storage system that the storage system is communicating with the host device of interest (e.g., host device 110), as opposed to another host device that is spoofing the host device of interest. The command may be cryptographically signed by the host device using a cryptographic key. The controller, after receiving the command, may verify a cryptographic signature associated with the command using a cryptographic key. The host device and the controller may each store a cryptographic key to be used for the authentication. The command may be authenticated to prevent the storage system from being subjected to spoofing attacks, man-in-the-middle attacks, side channel attacks, or other types of attacks.

In some implementations, the controller may autonomously determine whether to enable the fast bootup process in lieu of the normal bootup process, without receiving the command to enable fast bootup. In some implementations, the controller may determine, based on user input, a latency requirement associated with the storage system. For example, the user input may indicate that information loaded from the memory device is associated with an application having a strict latency requirement, such as less than a threshold latency (e.g., an aircraft operating system which needs to be launched in a relatively short time duration). The controller may autonomously determine, without receiving the command from the host device, whether to enable the fast bootup process based on the latency requirement. For example, the controller may determine to enable the fast bootup process for a lower latency requirement (e.g., less than a threshold latency time), and may determine to disable the fast bootup process for a higher latency requirement (e.g., greater than the threshold latency time). In some implementations, the controller may determine, based on user input, an environment associated with the storage system. For example, the user input may indicate that the storage system operates in a secure environment, in which changes to the information stored in the memory device of the storage system are relatively unlikely. The controller may autonomously determine, without receiving the command from the host device, whether to enable the fast bootup process based on the environment associated with the storage system. For example, the controller may determine to enable the fast bootup process if the storage system operates in an environment in which changes to the information are unlikely or infrequent (e.g., occur less than a threshold number of times per time period and/or with less than a threshold probability), and may determine to disable the fast bootup process if the storage system operates in an environment in which changes to the information are likely or frequent (e.g., occur greater than a threshold number of times per time period and/or with greater than a threshold probability).

In some implementations, the controller may determine an application type (e.g., aircraft application, automotive application, server application, or the like) associated with the information, and the controller may determine a latency requirement corresponding to the application type. The controller may determine the application type based on the information. For example, the information may include metadata that indicates the application type. The controller may access a table, which may be stored in the memory device, which indicates different application types and corresponding latency requirements. In other words, the controller may look up the application type in the table in order to determine the corresponding latency requirement. Depending on the latency requirement, the controller may autonomously determine, without receiving the command from the host device, whether to enable the fast bootup process. For example, for an aircraft application that requires a fast bootup time, the controller may enable the fast bootup process.

In some implementations, the controller may autonomously determine, without receiving the command from the host device, whether to enable the fast bootup process based on a determination that no changes have occurred to the information for a threshold number of power cycles, or based on a determination that a percentage of times that a change to the information has occurred (e.g., across all power cycles) is below a threshold. In some implementations, the controller may autonomously determine, without receiving the command from the host device, whether to enable the fast bootup process based on a determination that a number of changes that have occurred to the information exceed a threshold number of power cycles, or based on a determination that a percentage of times that a change to the information has occurred exceeds a threshold. For example, if the number of changes or the percentage is greater than a threshold, then the controller may disable the fast bootup process, and if the number of changes or the percentage is less than a threshold, then the controller may enable the fast bootup process. In some implementations (e.g., if the controller autonomously disables or determines to disable the fast bootup process), the controller may prevent a user from enabling the fast bootup process (e.g., via user input) and disabling the normal bootup process, irrespective of whether the command is received, which may potentially prevent tampering by an unauthorized user.

As shown by reference number 204, the controller may enable the fast bootup process based on the command and/or the autonomous determination to enable the fast bootup process, and the controller may disable the normal bootup process accordingly. The controller may update or set the fast boot flag stored in the memory device to a second value indicating that the fast boot process is enabled, such as a value of "1" or "ENABLED." The normal bootup process and the fast bootup process cannot both be enabled at the same time. The command received from the host device may switch an existing bootup process (e.g., the command may switch the storage system from using the normal bootup process to using the fast bootup process).

As shown by FIG. 2B, and by reference number 206, the controller may detect that the storage system has been powered on. The controller may detect that the storage system has been powered on based on a power cycling of the storage system, during which the storage system may be powered off and then powered on. In some implementations, the controller may enable the fast bootup process and disable the normal bootup process, and then the storage system may be powered off. The controller may detect when the storage system is powered back on, which may occur after the fast bootup process is enabled and the storage system has been powered off.

As shown by reference number 208, the controller may perform the fast bootup process based on the storage system being powered on and the fast boot flag being set to "ENABLED." The controller may perform the fast bootup process based on the fast bootup process being enabled for the storage system and the normal bootup process being disabled for the storage system, prior to the storage system being powered on. Further, after the storage system is powered on, the controller may retrieve the fast boot information that indicates the fast boot flag. When the fast boot flag is set to "ENABLED," the fast bootup process may be enabled, and the controller may determine to perform the fast bootup process.

In some implementations, during the fast bootup process, the controller may retrieve information (e.g., firmware, software, an operating system, application code, and/or data) stored in the memory device. The controller may not perform a verification of the information against expected values. In other words, the controller may not compare the information (or measurements associated with the information) against the expected values. During the fast bootup process, the controller may provide the information to the host device, where the host device may execute based on the information retrieved from the memory device. Because the controller may not perform the verification of the information, a bootup latency associated with the fast bootup process may be relatively small.

In some implementations, during the fast bootup process, the controller may still verify some parts of the information against expected values, but a majority of the information may not be verified against the expected values. For example, information that is considered essential for bootup (e.g., firmware) may be verified, but other types of information (e.g., software) may not be verified. In some implementations, parts of the information that are to be verified and parts of the information that are not to be verified may be configured based on authenticated commands from the host device. For example, based on the authenticated commands, certain types of information (e.g., firmware) may be verified, but other types of information (e.g., software) may not be verified.

In some implementations, the controller may perform the fast bootup process each time the storage system is powered on, until the controller receives an additional command that disables the fast bootup process and reenables the normal bootup process. In other words, the command to enable the fast bootup process may apply to a plurality of power cycles of the storage system (e.g., until the additional command is received).

As indicated above, FIGS. 2A-2B are provided as an example. Other examples may differ from what is described with regard to FIGS. 2A-2B.

Figure 3:
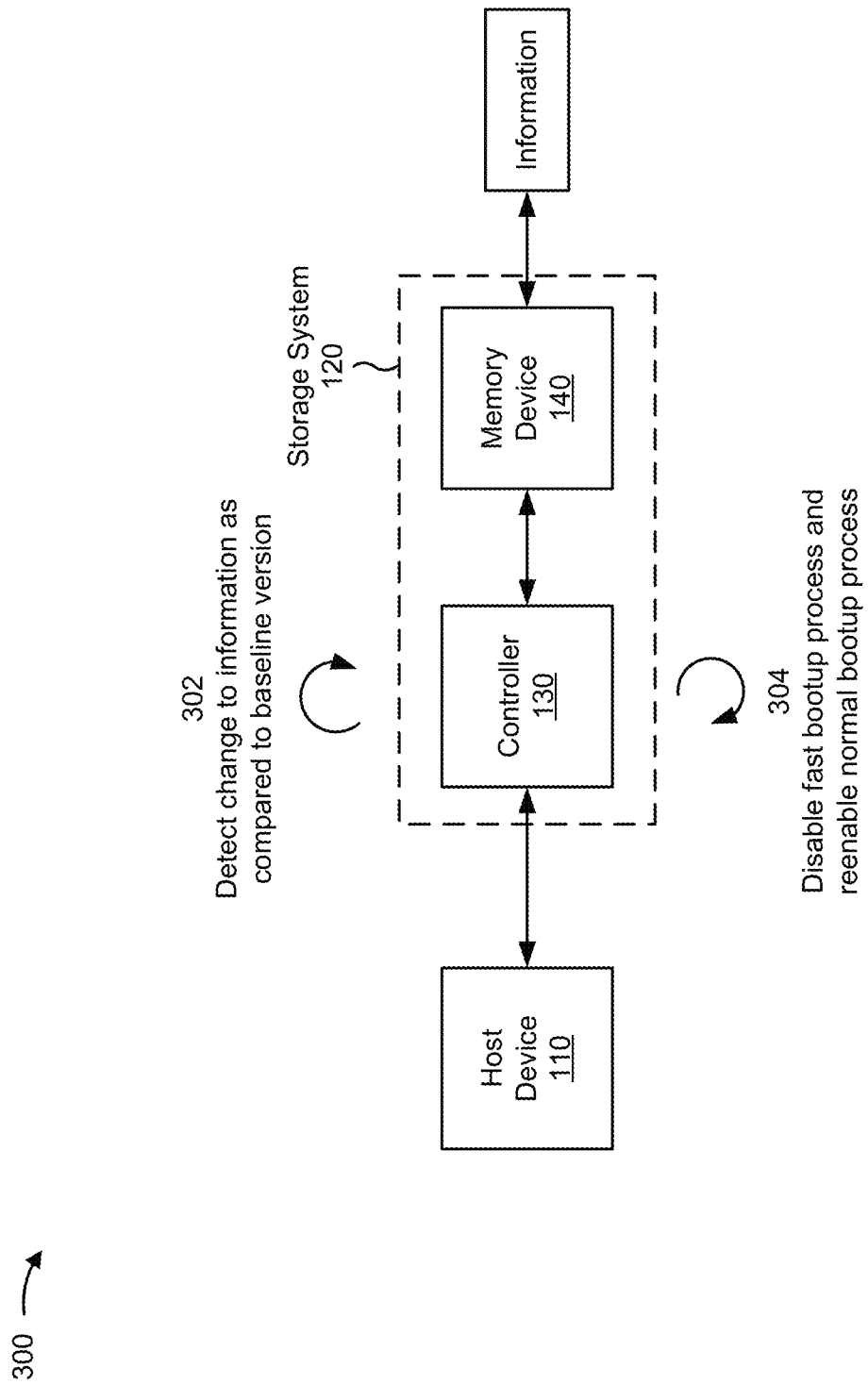
FIGS. 3-4 are diagrams illustrating examples of boot processes for storage systems.

FIG. 3 is a diagram illustrating an example 300 of a boot process for a storage system. The storage system may be storage system 120, as described above in connection with FIG. 1. The storage system may include a controller (e.g., controller 130) and a memory device (e.g., memory device 140). The storage system may communicate with a host device. The host device may be host device 110, as described above in connection with FIG. 1.

As shown by reference number 302, the controller may detect a change to information, stored in the memory device, as compared to a baseline version (or a previous version) of the information, which may also be stored in the memory device. The information may be firmware, software, an operating system, application code, and/or data, which may be loaded from the memory device during a fast bootup process of the storage system. The controller may periodically compare the information stored in the memory device to the baseline version of the information, which may enable the controller to detect whether any changes have been made to the information. The controller may detect the change to the information based on a checksum measurement, a measurement, a cyclic redundancy check, and/or a digest check. The change to the information may be a change to boot data, a change to a signed firmware signature, a change to a build number, and/or a change to a reference measurement (or Golden measurement) of a data block stored in a protected region of the memory device. The change to the information may be based on a firmware upgrade (e.g., a field firmware upgrade), a provisioning event (e.g., a first provisioning event or at a subsequent deprovision/provision cycle), a formatting of the memory device (e.g., a zeroization, which may involve deleting information from the memory device), and/or a use of a backup boot partition (e.g., a remediation, which may occur when a boot partition is corrupted and the backup boot partition is used).

As shown by reference number 304, the controller may disable the fast bootup process based on the change to the information, and the controller may reenable the normal bootup process. The controller may reset a fast boot counter (described in more detail below in connection with FIG. 4) associated with the fast bootup process to zero. The controller may reenable the normal bootup process due to the change to the information, which may necessitate a verification of the information, which may be achieved by the normal bootup process. In other words, the change to the information may potentially involve a harmful change, and if the information is not checked during a bootup of the storage system, the storage system may be unable to operate or may produce some other error. As a result, when the change to the information is detected, the controller may enable the normal bootup process to ensure that the information is properly verified.

In some implementations, the controller may create a new reference measurement based on the change to the information. The new reference measurement may incorporate the change to the information. The controller may delete a previous reference measurement, as the previous reference measurement may no longer be valid due to the change to the information. The controller may subsequently use the new reference measurement for the normal bootup process. During each normal bootup process, the controller may verify information retrieved from the memory device against the new reference measurement, and when the information corresponds to the new reference measurement, the controller may continue a bootup of the storage system.

As indicated above, FIG. 3 is provided as an example. Other examples may differ from what is described with regard to FIG. 3.

Figure 4:
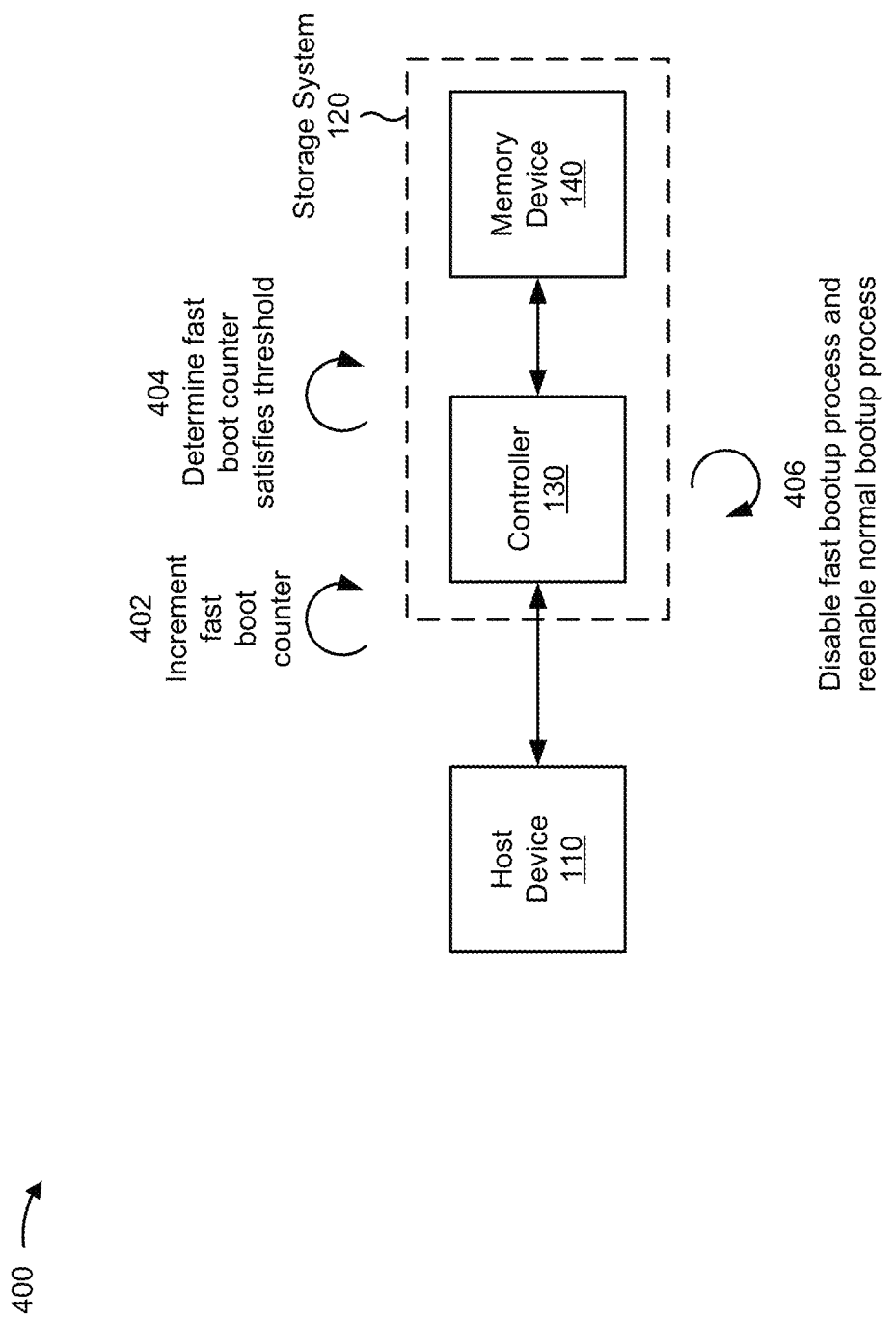

FIG. 4 is a diagram illustrating an example 400 of a boot process for a storage system. The storage system may be storage system 120, as described above in connection with FIG. 1. The storage system may include a controller (e.g., controller 130) and a memory device (e.g., memory device 140). The storage system may communicate with a host device. The host device may be host device 110, as described above in connection with FIG. 1.

As shown by reference number 402, the controller may increment a fast boot counter, associated with the fast bootup process, after the fast bootup process is performed due to the storage system being powered on. The controller may increment the fast boot counter each time the storage system is powered on and the fast bootup process is performed. The fast boot counter may be a counter that tracks a number of times that the fast boot process has been performed. The fast boot counter may be a safety counter, which may keep a persistent count of the number of times that the fast boot process has been performed.

As shown by reference number 404, the controller may determine that the fast boot counter satisfies (e.g., is greater than or equal to) a fast boot count threshold. The fast boot count threshold may be a predefined threshold, which may set a maximum number of times that the fast boot process should be performed. Each time the fast boot process is performed, the controller may compare the fast boot counter to the fast boot count threshold. The fast boot count threshold may be a user defined value. For example, the fast boot count threshold may be modified by authenticated commands received from the host device. A field width associated with the fast boot count threshold may be, for example, an unsigned value that ranges from 8 bits to 32 bits.

As shown by reference number 406, the controller may disable the fast bootup process based on the fast boot counter satisfying the fast boot count threshold, and the controller may reenable the normal bootup process. In other words, after the fast boot count threshold is satisfied, the controller may automatically revert back to the normal bootup process. The controller may set a fast boot flag stored in the memory device to "DISABLED." The controller may disable the fast bootup process and enable the normal bootup process for a next bootup cycle of the storage system. The fast boot count threshold may ensure that the fast bootup process, which may be enabled based on user input, is not enabled indefinitely, which may pose a security risk to the storage system. Thus, the fast boot count threshold may ensure that information stored in the storage system is periodically checked during bootup of the storage system.

In some implementations, the fast boot count threshold may be a factory setting. The fast boot count threshold may depend on the information that is being retrieved from the memory device (e.g., an application that is being loaded from the memory device). For example, when the information is associated with a critical application, the fast boot count threshold may be set relatively low, which may ensure that the information is periodically verified using the normal bootup process. As another example, when the information is associated with a non-critical application, the fast boot count threshold may be set relatively high. In this case, relatively large amounts of time between verifications of the information may be acceptable.

In some implementations, the controller may autonomously set the fast boot count threshold. As an example, the controller may determine, based on user input and/or historical changes to information stored in the memory device, that the information is likely to change and/or an environment associated with the storage system is insecure. In this case, the controller may set a low fast boot count threshold. As another example, the controller may determine, based on the user input and/or the historical changes to the information stored in the memory device, that the information is unlikely to change and/or the environment associated with the storage system is secure. In this case, the controller may set a high fast boot count threshold. The controller may access the historical changes to information, which may be stored in the memory device, and then set the fast boot count threshold based on the historical changes to information. The controller may autonomously set the fast boot count threshold, similar to the controller autonomously enabling the fast bootup process as described in connection with FIGS. 2A-2B.

In some implementations, the controller may determine that the fast bootup process has been enabled for an amount of time (e.g., 30 days) that satisfies a threshold. The controller may disable the fast bootup process based on the fast bootup process being enabled for the amount of time that satisfies the threshold. The controller may reenable the normal bootup process based on the fast bootup process being enabled for the amount of time that satisfies the threshold.

In some implementations, the controller may determine to revert back to the normal bootup process based on the fast boot counter and/or the amount of time. After the controller disables the fast bootup process and reenables the normal bootup process due to the fast boot counter and/or the amount of time satisfying the threshold, the controller may receive a second command. The second command may be to reenable the fast bootup process after the fast bootup process has been disabled. The second command may be based on additional user input. A user of the storage system may determine that the storage system is in a secure environment in which information stored in the memory device is unlikely to be changed, so the additional user input may indicate that the storage system should switch back to the fast bootup process. Further, after the controller switches back to the fast bootup process, the controller may reset the fast boot counter, and the fast boot counter may again be incremented each time the fast bootup process is performed. The controller may reset the fast boot counter and subsequent fast bootup processes may be performed without user input and/or a corresponding command from the host device.

As indicated above, FIG. 4 is provided as an example. Other examples may differ from what is described with regard to FIG. 4.

Figure 5:
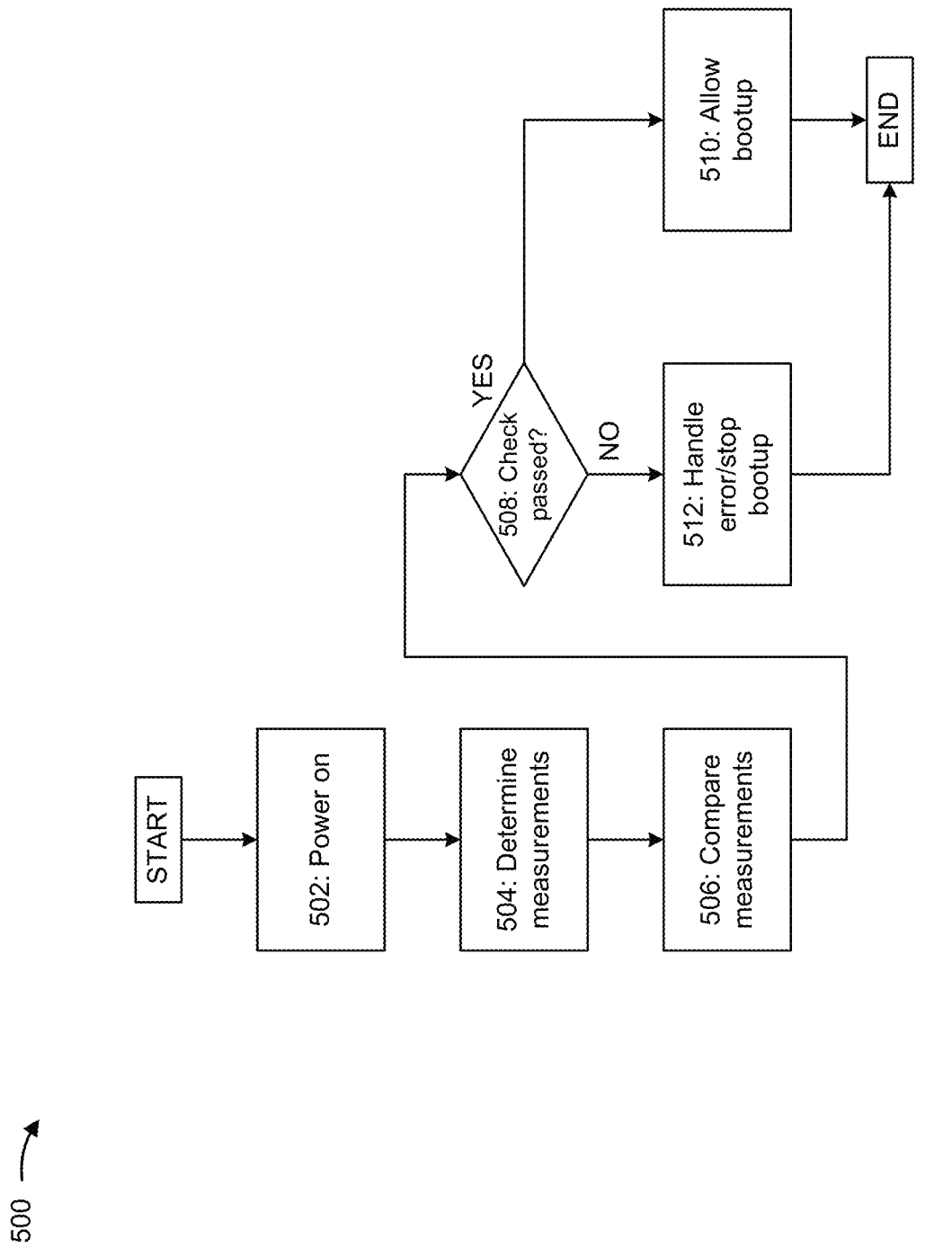
FIGS. 5-9 are diagrams illustrating examples of performing boot processes for storage systems.

FIG. 5 is a diagram illustrating an example 500 of performing a boot process for a storage system. The boot process may be performed by a storage system. The storage system may be storage system 120, as described above in connection with FIG. 1. The storage system may include a controller (e.g., controller 130) and a memory device (e.g., memory device 140).

As shown by reference number 502, the storage system may be powered on and booted up. As shown by reference number 504, a controller of the storage system may determine measurements (e.g., auto measurements) of a boot region of the memory device. A location of the boot region may be based on a pre-configuration. In other words, the boot region may be preconfigured. The boot region of the memory device may contain information (e.g., firmware, software, an operating system, application code, and/or data), which may be loaded from the memory device during a bootup of the storage system. As shown by reference number 506, the controller may compare the measurements of the boot region with reference measurements (e.g., Golden measurements). As shown by reference number 508, the controller may determine whether the measurements of the boot region correspond to the reference measurements. As shown by reference number 510, when the measurements of the boot region correspond to the reference measurements, the controller may allow a bootup (e.g., by sending bootup information to the host device). As shown by reference number 512, when the measurements of the boot region do not correspond to the reference measurements, the controller may perform an error handling and/or stop the bootup of the storage system.

As indicated above, FIG. 5 is provided as an example. Other examples may differ from what is described with regard to FIG. 5.

Figure 6:
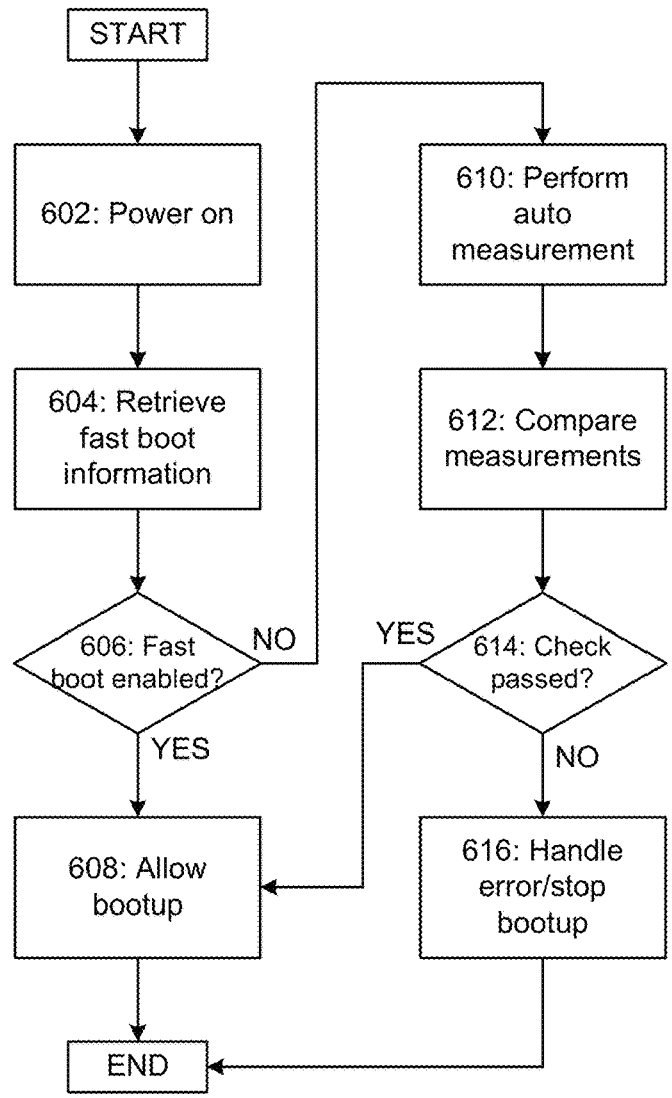

FIG. 6 is a diagram illustrating an example 600 of performing a boot process for a storage system. The boot process may be performed by a storage system. The storage system may be storage system 120, as described above in connection with FIG. 1. The storage system may include a controller (e.g., controller 130) and a memory device (e.g., memory device 140).

As shown by reference number 602, the storage system may be powered on and booted up. As shown by reference number 604, a controller of the storage system may retrieve fast boot information from a protected region of the memory device. The fast boot information may indicate a fast boot flag. A default value of the fast boot flag may be set to "DISABLED." When the fast boot flag is set to "ENABLED," a fast bootup process may be enabled. As shown by reference number 606, the controller may determine whether the fast bootup process is enabled based on the fast boot information. As shown by reference number 608, when the fast bootup process is enabled, the controller may allow a bootup (e.g., by sending bootup information to the host device) without performing the measurements shown with respect to reference numbers 610 and 612. As shown by reference number 610, when the fast bootup process is not enabled, the controller may determine measurements (e.g., auto measurements) of a boot region of the memory device. The boot region of the memory device may contain information (e.g., firmware, software, an operating system, application code, and/or data), which may be loaded from the memory device during a bootup of the storage system. As shown by reference number 612, the controller may compare the measurements of the boot region with reference measurements (e.g., Golden measurements). As shown by reference number 614, the controller may determine whether the measurements of the boot region correspond to the reference measurements. When the measurements of the boot region correspond to the reference measurements, the controller may allow a bootup (e.g., by sending bootup information to the host device). As shown by reference number 616, when the measurements of the boot region do not correspond to the reference measurements, the controller may perform an error handling and/or stop the bootup of the storage system.

As indicated above, FIG. 6 is provided as an example. Other examples may differ from what is described with regard to FIG. 6.

Figure 7:
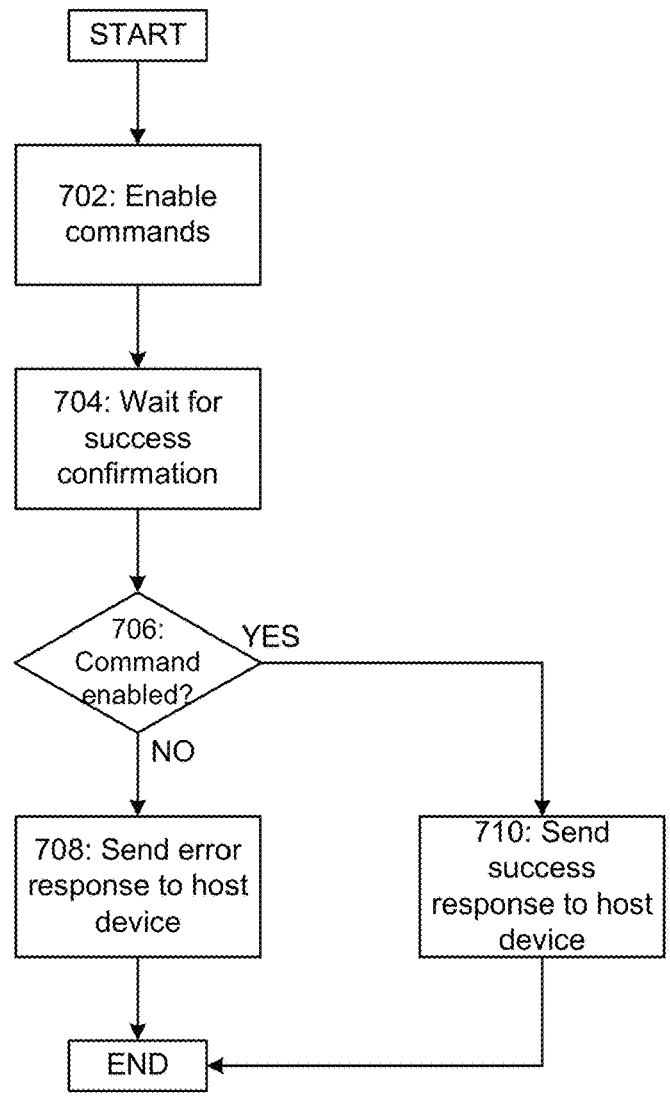

FIG. 7 is a diagram illustrating an example 700 of performing a boot process for a storage system. The boot process may be performed by a storage system. The storage system may be storage system 120, as described above in connection with FIG. 1. The storage system may include a controller (e.g., controller 130) and a memory device (e.g., memory device 140). The storage system may communicate with a host device. The host device may be host device 110, as described above in connection with FIG. 1.

As shown by reference number 702, a controller of the storage system may enable authenticated commands for the host device to communicate authenticated commands to the controller. The authenticated commands may be signed vendor commands. As shown by reference number 704, the controller may wait for a success confirmation from the host device. As shown by reference number 706, the controller may determine whether the use of authenticated commands is successfully enabled. As shown by reference number 708, when the controller determines that the use of authenticated commands is not successfully enabled, the controller may send an error response to the host device. As shown by reference number 710, when the controller determines that the use of authenticated commands is successfully enabled, the controller may send a success response to the host device.

As indicated above, FIG. 7 is provided as an example. Other examples may differ from what is described with regard to FIG. 7.

Figure 8:
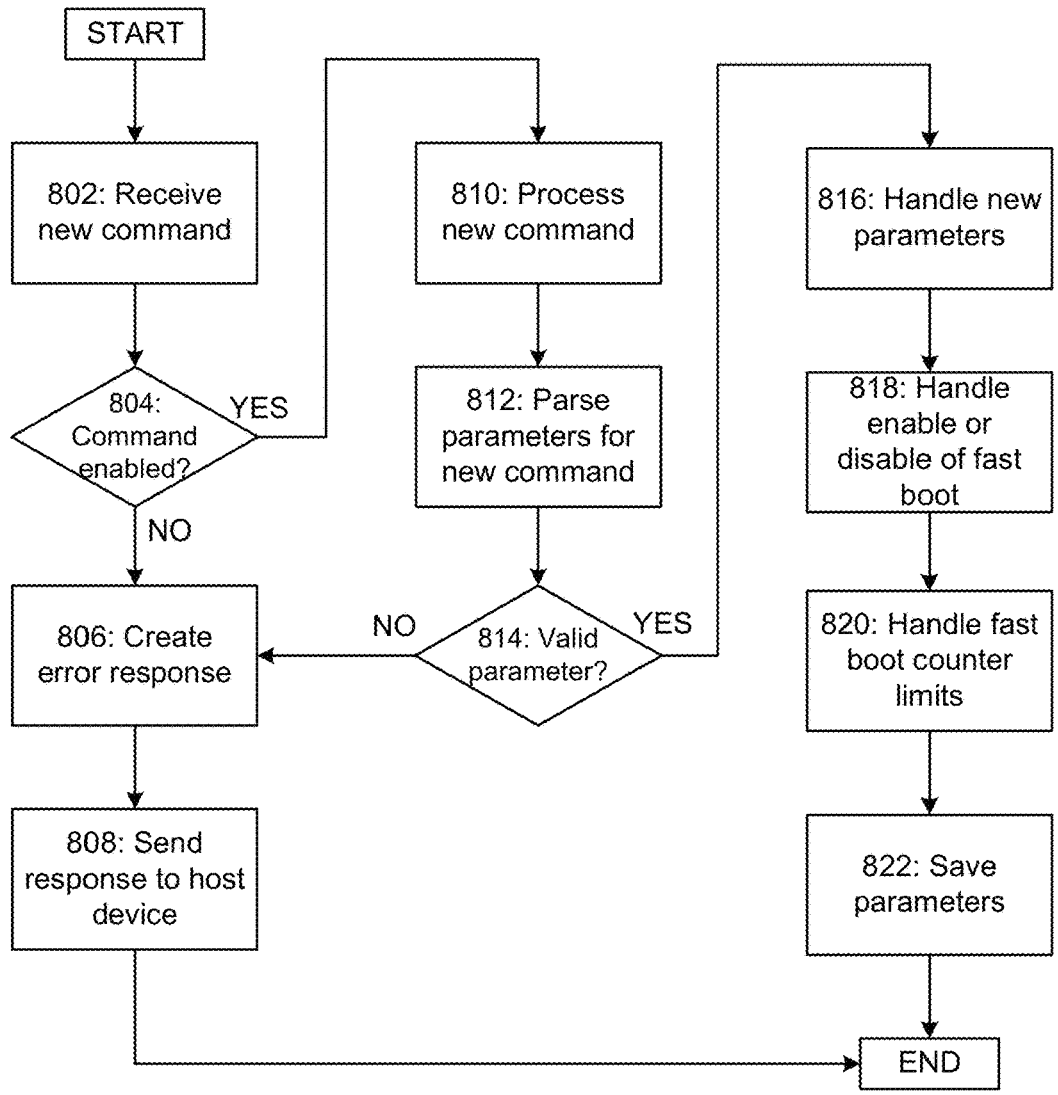

FIG. 8 is a diagram illustrating an example 800 of performing a boot process for a storage system. The boot process may be performed by a storage system. The storage system may be storage system 120, as described above in connection with FIG. 1. The storage system may include a controller (e.g., controller 130) and a memory device (e.g., memory device 140).

As shown by reference number 802, a controller of the storage system may receive a new command from a host device. The new command may be an authenticated command (e.g., a signed vendor command). As shown by reference number 804, the controller may determine whether authenticated commands are enabled (e.g., whether the storage system is able to receive authenticated commands from the host device). As shown by reference number 806, when authenticated commands are not enabled, the controller may create an error response. As shown by reference number 808, the controller may send the error response to the host device. As shown by reference number 810, when authenticated commands are enabled, the controller may process the new command. As shown by reference number 812, the controller may parse parameters of the new command. As shown by reference number 814, the controller may determine whether the parameters indicated in the new command are valid. When the parameters are not valid, the controller may create the error response and send the error response to the host device. As shown by reference number 816, when the parameters are valid, the controller may handle the parameters. As shown by reference number 818, the controller may enable a fast bootup process or disable the fast bootup process based on the parameters indicated by the new command. As shown by reference number 820, the controller may handle fast boot counter limits (e.g., may define a threshold for a fast boot counter). As shown by reference number 822, the controller may store the parameters in a protected region of the memory device (e.g., a non-host-addressable region).

As indicated above, FIG. 8 is provided as an example. Other examples may differ from what is described with regard to FIG. 8.

Figure 9:
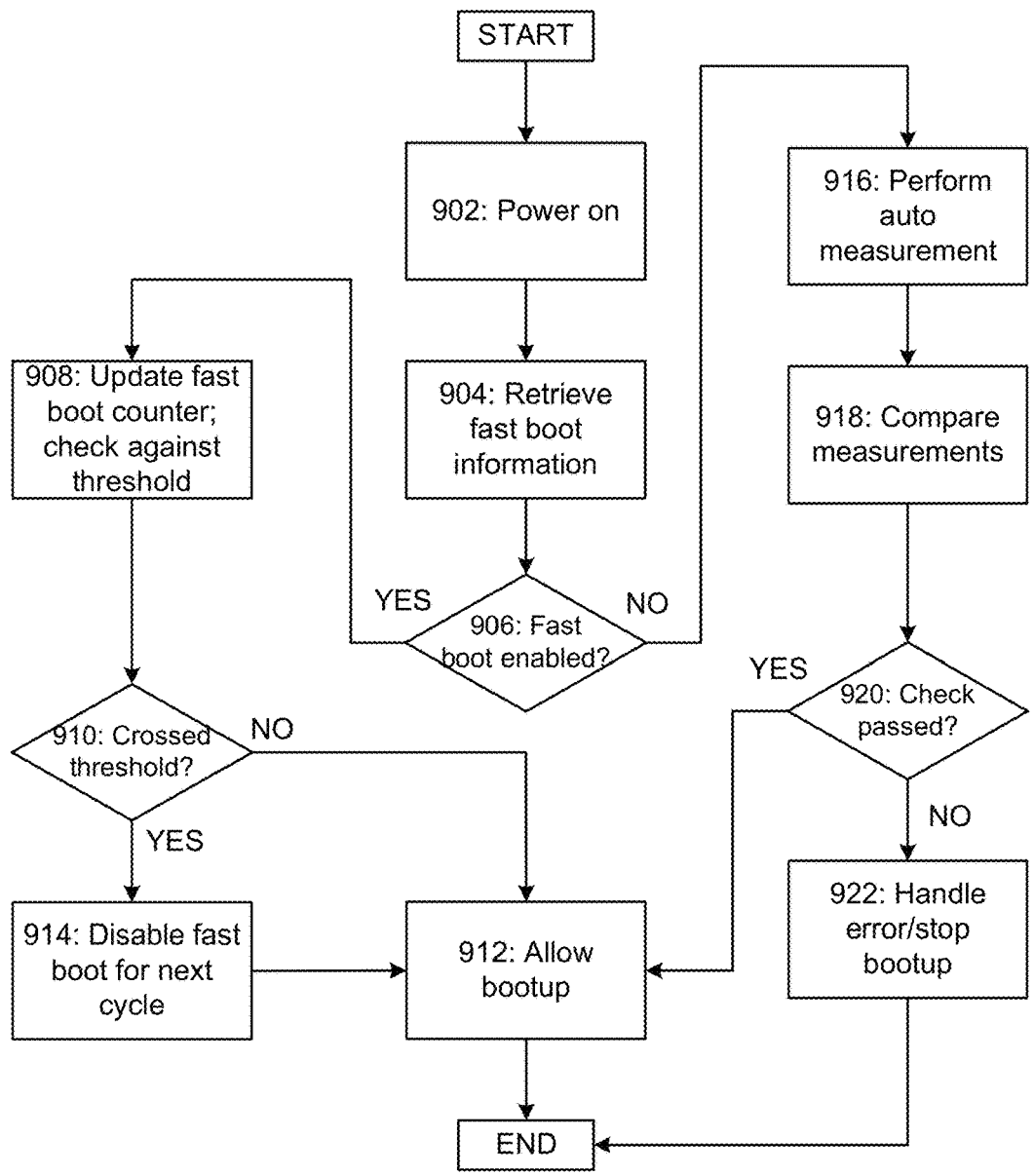

FIG. 9 is a diagram illustrating an example 900 of performing a boot process for a storage system. The boot process may be performed by a storage system. The storage system may be storage system 120, as described above in connection with FIG. 1. The storage system may include a controller (e.g., controller 130) and a memory device (e.g., memory device 140).

As shown by reference number 902, the storage system may be powered on and booted up. As shown by reference number 904, a controller of the storage system may retrieve fast boot information from a protected region of the memory device. The fast boot information may indicate a fast boot flag. A default value of the fast boot flag may be set to "DISABLED." When the fast boot flag is set to "ENABLED," a fast bootup process may be enabled. As shown by reference number 906, the controller may determine whether the fast bootup process is enabled based on the fast boot information. As shown by reference number 908, when the fast bootup process is enabled, the controller may update a fast boot counter and check the fast boot counter against a threshold. As shown by reference number 910, the controller may determine whether the fast boot counter satisfies the threshold. As shown by reference number 912, when the fast boot counter does not satisfy the threshold, the controller may allow a bootup. As shown by reference number 914, when the fast boot counter satisfies the threshold, the controller may disable the fast bootup process for a next bootup cycle, and then the controller may allow the bootup.

As shown by reference number 916, when the fast bootup process is not enabled, the controller may determine measurements (e.g., auto measurements) of a boot region of the memory device. The boot region of the memory device may contain information (e.g., firmware, software, an operating system, application code, and/or data), which may be loaded from the memory device during a bootup of the storage system. As shown by reference number 918, the controller may compare the measurements of the boot region with reference measurements (e.g., Golden measurements). As shown by reference number 920, the controller may determine whether the measurements of the boot region correspond to the reference measurements. When the measurements of the boot region correspond to the reference measurements, the controller may allow a bootup. As shown by reference number 922, when the measurements of the boot region do not correspond to the reference measurements, the controller may perform an error handling and/or stop the bootup of the storage system.

As indicated above, FIG. 9 is provided as an example. Other examples may differ from what is described with regard to FIG. 9.

Figure 10:
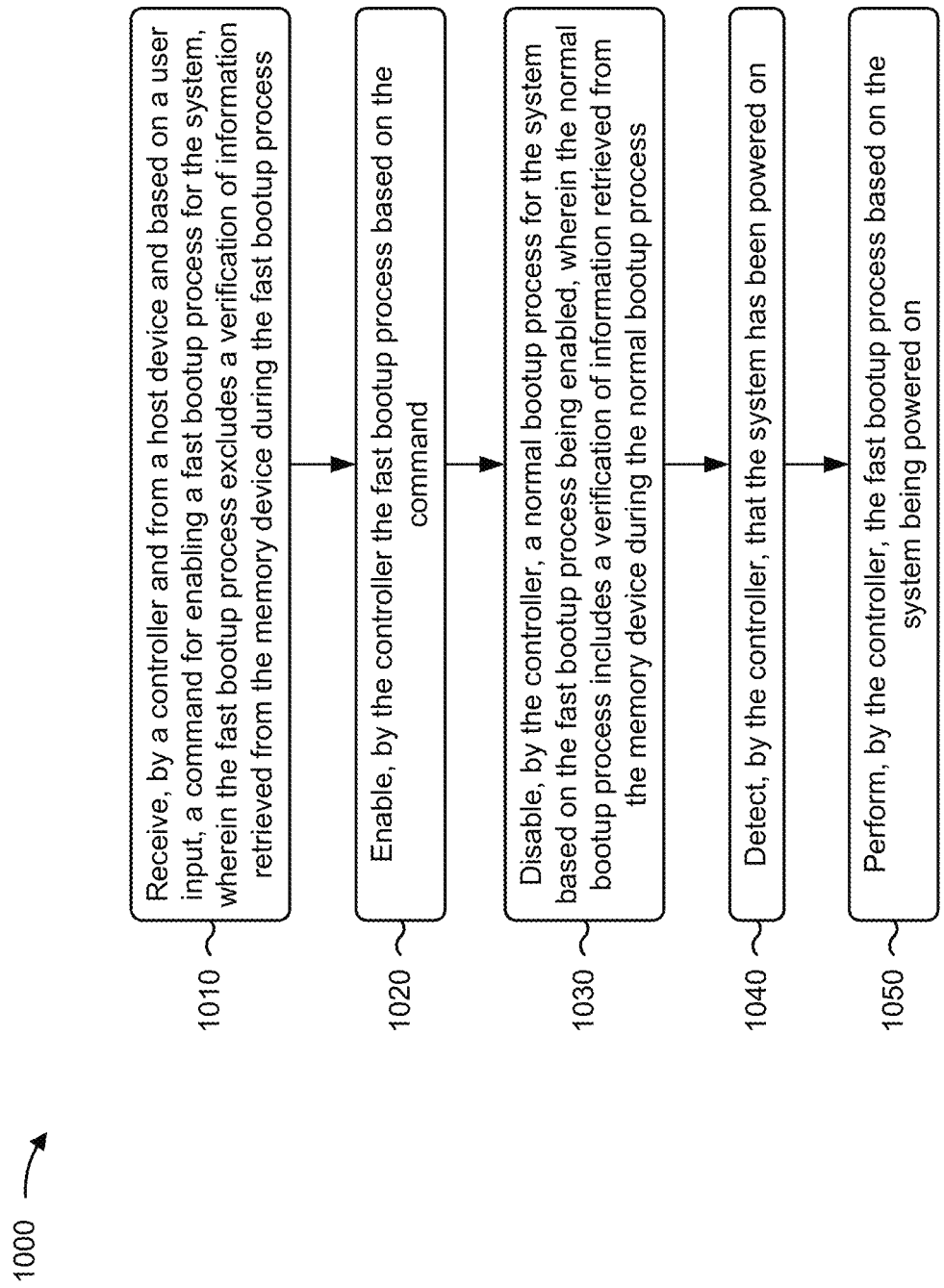
FIGS. 10-11 are flowcharts of example methods associated with boot processes for storage systems.

FIG. 10 is a flowchart of an example method 1000 associated with a boot process for a storage system. In some implementations, a storage system (e.g., storage system 120) may perform or may be configured to perform one or more process blocks of FIG. 10. In some implementations, another device or a group of devices separate from or including the storage system (e.g., host device 110) may perform or may be configured to perform one or more process blocks of FIG. 10. Additionally, or alternatively, one or more components of the storage system (e.g., controller 130, and/or memory device 140) may perform or may be configured to perform one or more process blocks of FIG. 10.

As shown in FIG. 10, the method 1000 may include receiving, by a controller and from a host device and based on a user input, a command for enabling a fast bootup process for the system, wherein the fast bootup process excludes a verification of information retrieved from the memory device during the fast bootup process (block 1010). As further shown in FIG. 10, the method 1000 may include enabling, by the controller the fast bootup process based on the command (block 1020). As further shown in FIG. 10, the method 1000 may include disabling, by the controller, a normal bootup process for the system based on the fast bootup process being enabled, wherein the normal bootup process includes a verification of information retrieved from the memory device during the normal bootup process (block 1030). As further shown in FIG. 10, the method 1000 may include detecting, by the controller, that the system has been powered on (block 1040). As further shown in FIG. 10, the method 1000 may include performing, by the controller, the fast bootup process based on the system being powered on (block 1050).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein, such as the operations described in connection with FIGS. 1-9.

Figure 11:
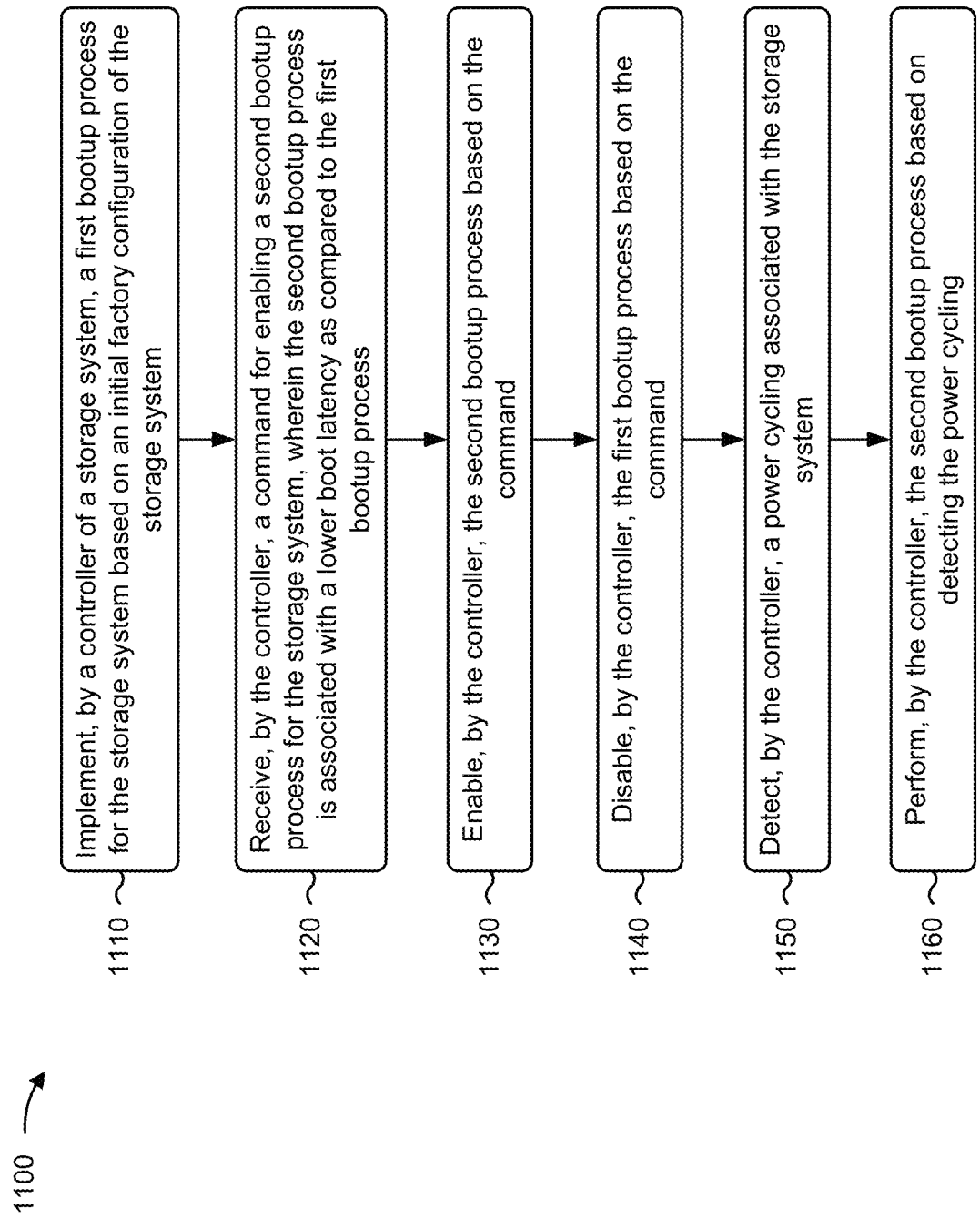

FIG. 11 is a flowchart of an example method 1100 associated with a boot process for a storage system. In some implementations, a storage system (e.g., storage system 120) may perform or may be configured to perform one or more process blocks of FIG. 11. In some implementations, another device or a group of devices separate from or including the storage system (e.g., host device 110) may perform or may be configured to perform one or more process blocks of FIG. 11. Additionally, or alternatively, one or more components of the storage system (e.g., controller 130, and/or memory device 140) may perform or may be configured to perform one or more process blocks of FIG. 11.

As shown in FIG. 11, the method 1100 may include implementing, by a controller of a storage system, a first bootup process for the storage system based on an initial factory configuration of the storage system (block 1110). As further shown in FIG. 11, the method 1100 may include receiving, by the controller, a command for enabling a second bootup process for the storage system, wherein the second bootup process is associated with a lower boot latency as compared to the first bootup process (block 1120). As further shown in FIG. 11, the method 1100 may include enabling, by the controller, the second bootup process based on the command (block 1130). As further shown in FIG. 11, the method 1100 may include disabling, by the controller, the first bootup process based on the command (block 1140). As further shown in FIG. 11, the method 1100 may include detecting, by the controller, a power cycling associated with the storage system (block 1150). As further shown in FIG. 11, the method 1100 may include performing, by the controller, the second bootup process based on detecting the power cycling (block 1160).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 1-9.

Figure 12:
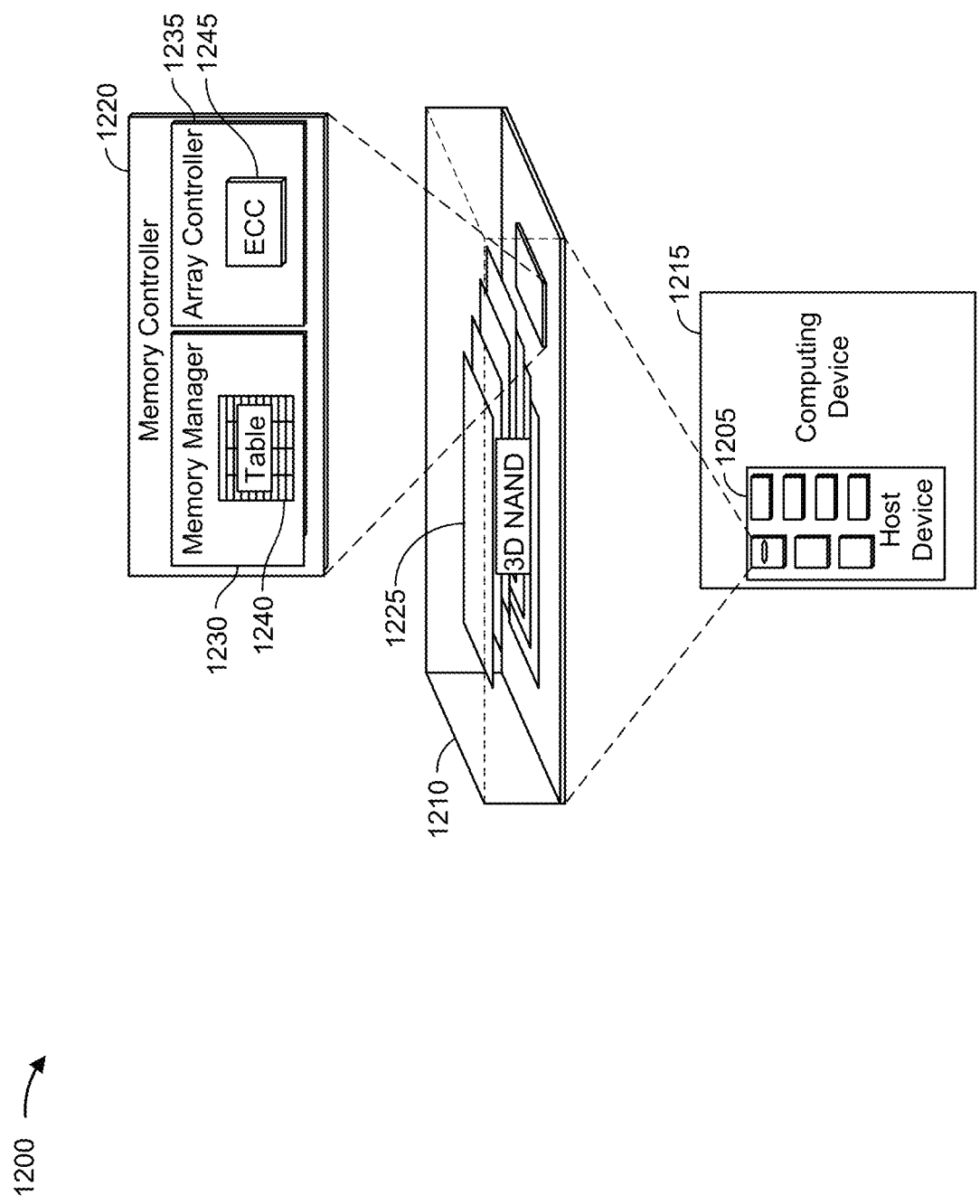
FIG. 12 is a diagram illustrating an example environment that includes a memory device.

FIG. 12 is a diagram illustrating an example environment 1200 that includes a memory device. As shown in FIG. 12, the environment 1200 includes a host device 1205 and a memory device 1210 configured to communicate via a communication interface. The host device 1205 and/or the memory device 1210 may be included in a computing device 1215, such as a computer, a server, and/or an IoT device. For example, the memory device 1210 may be a discrete memory component of the host device 1205. Alternatively, the memory device 1210 may be a portion of an integrated circuit that is included with one or more other components of the host device 1205. In some implementations, the host device 1205 may be host device 110 of FIG. 1, and/or the memory device 1210 may be memory device 140 of FIG. 1.

The memory device 1210 may include a memory controller 1220, which may be controller 130 of FIG. 1. Additionally, or alternatively, the memory device 1210 may include a memory array 1225. The memory array 1225 may include one or more memory dies. The memory array 1225 is shown as a three-dimensional (3D) NAND array. In 3D array semiconductor memory technology, memory structures are stacked vertically, which increases the quantity of memory cells that can fit in a given die size. Although the memory array 1225 is shown as a 3D array, in some implementations, the memory array 1225 is a two-dimensional (2D) array.

The host device 1205 and/or the memory device 1210 may include one or more communication interfaces configured to transfer data between the memory device 1210 and one or more components of the host device 1205. For example, the host device 1205 and/or the memory device 1210 may include a Serial Advanced Technology Attachment (SATA) interface, a Peripheral Component Interconnect Express (PCIe) interface, a USB interface, a Universal Flash Storage (UFS) interface, and/or an embedded multimedia card (eMMC) interface.

The memory controller 1220 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the memory controller 1220. The memory controller 1220 may execute the set of instructions to perform one or more operations or methods described herein. In some implementations, execution of the set of instructions, by the memory controller 1220, causes the memory controller 1220 and/or the memory device 1210 to perform one or more operations or methods described herein. In some implementations, hardwired circuitry is used instead of or in combination with the instructions to perform one or more operations or methods described herein. Additionally, or alternatively, the memory controller 1220 and/or one or more components of the memory device 1210 may be configured to perform one or more operations or methods described herein.

The memory controller 1220 may receive one or more instructions from the host device 1205 and may communicate with the memory array based on the one or more instructions, such as to transfer data to (e.g., write or program), to transfer data from (e.g., read), and/or to erase a portion of the memory array 1225 (e.g., one or more memory cells, pages, sub-blocks, blocks, or planes of the memory array 1225). Additionally, or alternatively, the memory controller 1220 may include one or more components configured to control access to the memory array 1225 and/or to provide a translation layer between the host device 1205 and the memory device 1210 for access to the memory array 1225. The memory controller 1220 may include one or more input/output (I/O) circuits, lines, or interfaces to transfer data to or from the memory array 1225. In some implementations, the memory controller 1220 may include a memory manager 1230 and/or an array controller 1235.

The memory manager 1230 may include one or more components (e.g., circuitry) configured to perform one or more memory management functions, such as wear leveling, error detection, error correction, block retirement, or one or more other memory management functions. The memory manager 1230 may parse or format a host command (e.g., a command received from the host device 1205) into a memory command (e.g., a command for performing an operation on the memory array 1225). Additionally, or alternatively, the memory manager 1230 may generate one or more memory commands based on one or more instructions received from the array controller 1235 and/or one or more other components of the memory device 1210.

The memory manager 1230 may include or may operate using one or more memory management tables 1240 configured to store information associated with the memory array 1225. For example, a memory management table 1240 may include information regarding block age, block erase count, error history, or one or more error counts associated with one or more blocks of memory cells included in the memory array 1225.

The array controller 1235 may include one or more components (e.g., circuitry) configured to control one or more memory operations associated with writing data to, reading data from, or erasing one or more memory cells of the memory array 1225. The one or more memory operations may be based on, for example, a host command received from the host device 1205 or a command generated internally by the memory device 1210 (e.g., in association with wear leveling, error detection, and/or error correction). In some implementations, the array controller 1235 may include an error correction code (ECC) component 1245. The ECC component 1245 may include one or more components configured to detect or correct errors associated with writing data to or reading data from one or more memory cells of the memory array 1225.

One or more devices or components shown in FIG. 12 may be used to carry out operations described elsewhere herein, such as one or more operations of FIGS. 2A-2B and/or 3-9 and/or one or more process blocks of the methods of FIGS. 10-11.

As indicated above, FIG. 12 is provided as an example. Other examples may differ from what is described with regard to FIG. 12.

Figure 13:
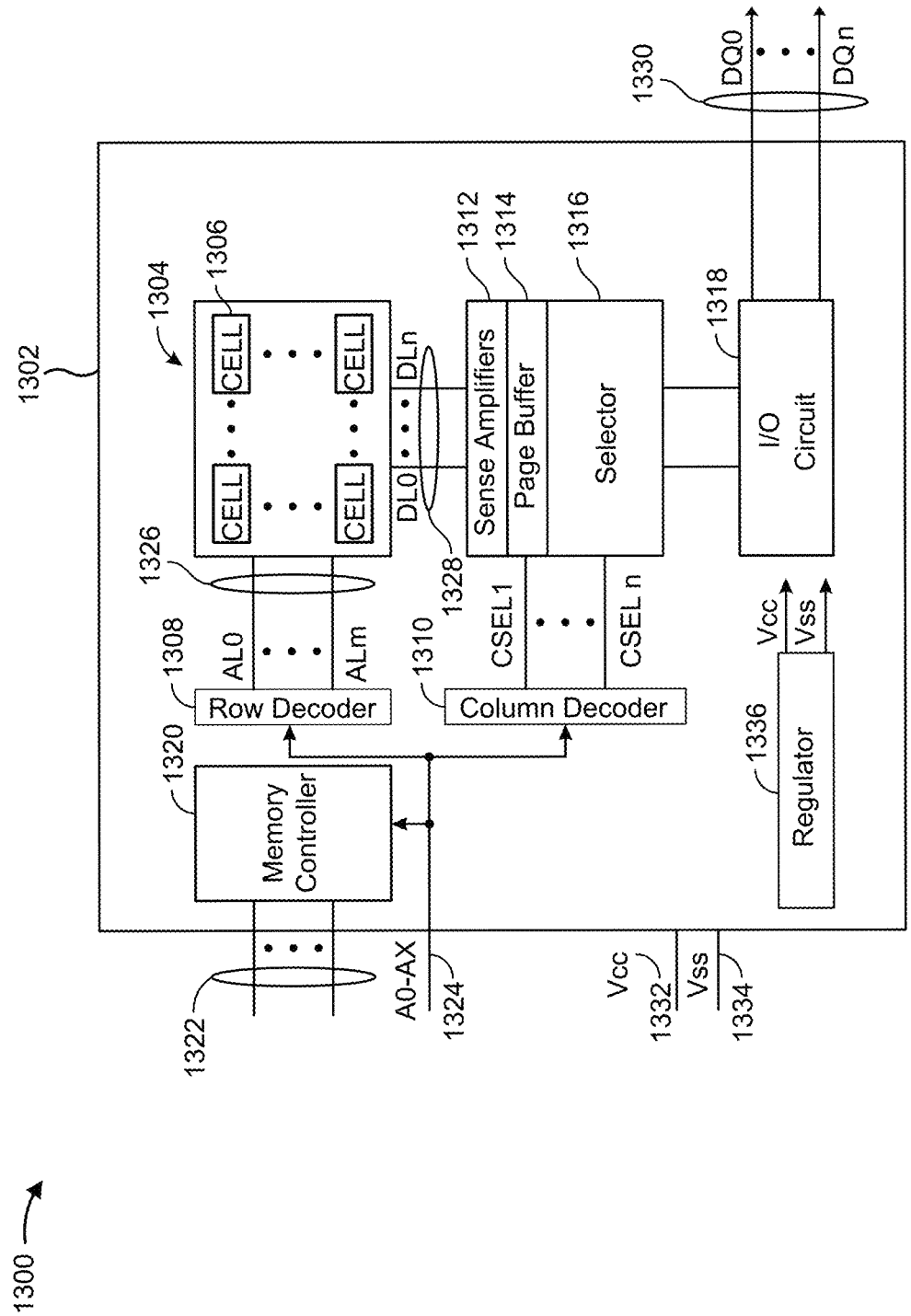
FIG. 13 is a diagram illustrating an example of components included in a memory device.

FIG. 13 is a diagram illustrating an example 1300 of components included in a memory device 1302. The memory device 1302 may be the memory device 1210 and/or memory device 140. The memory device 1302 may include a memory array 1304 having multiple memory cells 1306. The memory device 1302 may include one or more components (e.g., circuits) to transmit signals to or perform memory operations on the memory array 1304. For example, the memory device 1302 may include a row decoder 1308, a column decoder 1310, one or more sense amplifiers 1312, a page buffer 1314, a selector 1316, an input/output (I/O) circuit 1318, and a memory controller 1320. The memory controller 1320 may be the memory controller 1220 and/or controller 130.

The memory controller 1320 may control memory operations of the memory device 1302 according to one or more signals received via one or more control lines 1322, such as one or more clock signals or control signals that indicate an operation (e.g., write, read, or erase) to be performed. Additionally, or alternatively, the memory controller 1320 may determine one or memory cells 1306 upon which the operation is to be performed based on one or more signals received via one or more address lines 1324, such as one or more address signals (shown as A0-AX). A host device external from the memory device 1302 may control the values of the control signals on the control lines 1322 and/or the address signals on the address line 1324.

The memory device 1302 may use access lines 1326 (sometimes called word lines or row lines, and shown as AL0-ALm) and data lines 1328 (sometimes called digit lines, bit lines, or column lines, and shown as DL0-DLn) to transfer data to or from one or more of the memory cells 1306. For example, the row decoder 1308 and the column decoder 1310 may receive and decode the address signals (A0-AX) from the address line 1324 and may determine which of the memory cells 1306 are to be accessed based on the address signals. The row decoder 1308 and the column decoder 1310 may provide signals to those memory cells 1306 via one or more access lines 1326 and one or more data lines 1328, respectively.

For example, the column decoder 1310 may receive and decode address signals into one or more column select signals (shown as CSEL1-CSELn). The selector 1316 may receive the column select signals and may select data in the page buffer 1314 that represents values of data to be read from or to be programmed into memory cells 1306. The page buffer 1314 may be configured to store data received from a host device before the data is programmed into relevant portions of the memory array 1304, or the page buffer 1314 may store data read from the memory array 1304 before the data is transmitted to the host device. The sense amplifiers 1312 may be configured to determine the values to be read from or written to the memory cells 1306 using the data lines 1328. For example, in a selected string of memory cells 1306, a sense amplifier 1312 may read a logic level in a memory cell 1306 in response to a read current flowing through the selected string to a data line 1328. The I/O circuit 1318 may transfer values of data into or out of the memory device 1302 (e.g., to or from a host device), such as into or out of the page buffer 1314 or the memory array 1304, using I/O lines 1330 (shown as (DQ0-DQn)).

The memory controller 1320 may receive positive and negative supply signals, such as a supply voltage (Vcc) 1332 and a negative supply (Vss) 1334 (e.g., a ground potential), from an external source or power supply (e.g., an internal battery, an external battery, and/or an AC-to-DC converter). In some implementations, the memory controller 1320 may include a regulator 1336 to internally provide positive or negative supply signals.

One or more devices or components shown in FIG. 13 may be used to carry out operations described elsewhere herein, such as one or more operations of FIGS. 2A-2B and/or 3-9 and/or one or more process blocks of the methods of FIGS. 10-11.

As indicated above, FIG. 13 is provided as an example. Other examples may differ from what is described with regard to FIG. 13.

Figure 14:
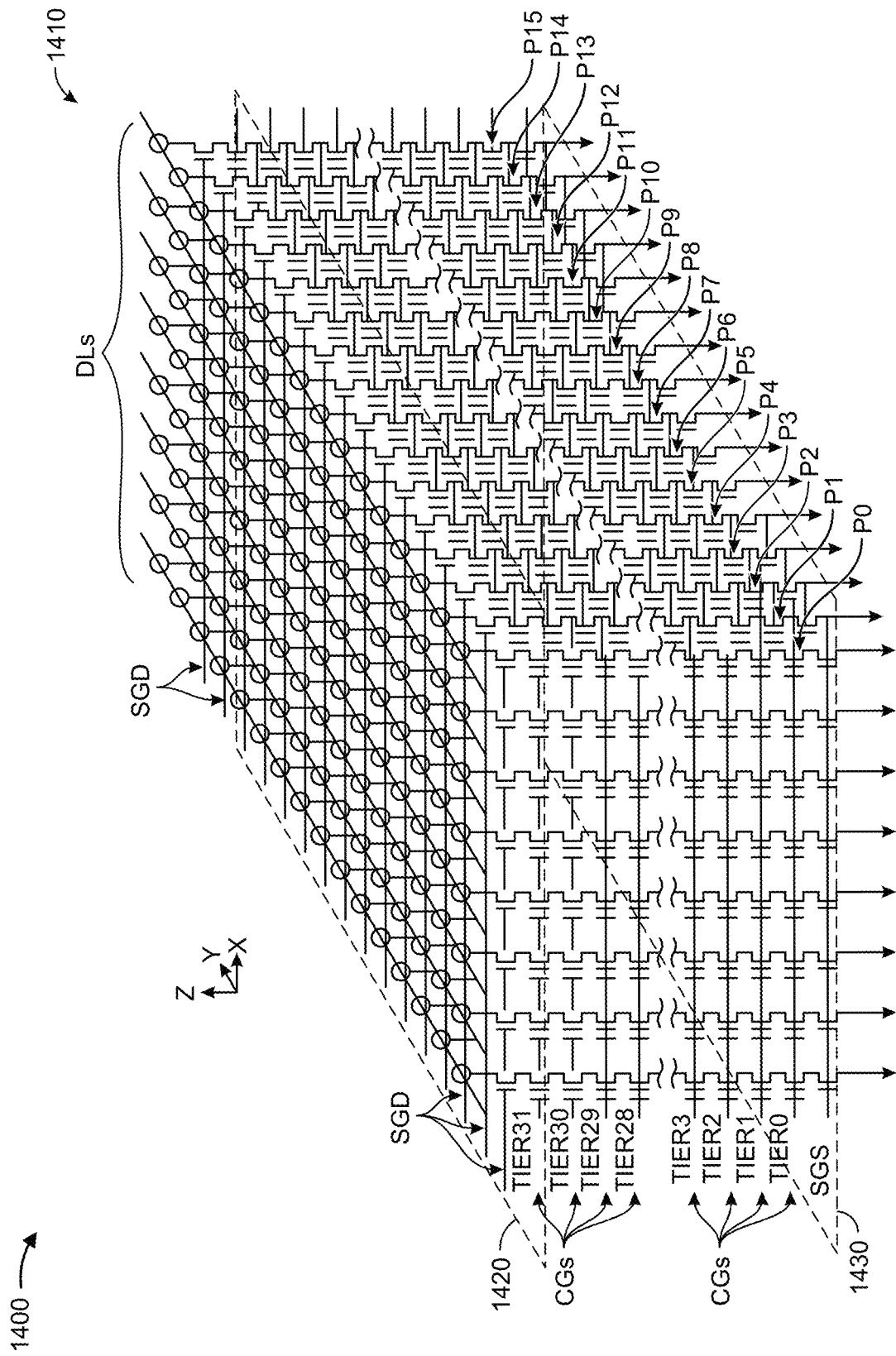
FIG. 14 is a diagram illustrating an example of a memory array.

FIG. 14 is a diagram illustrating an example 1400 of a memory array 1410. Although FIG. 14 shows a 3D NAND memory array, some implementations described herein may be performed in connection with another type of memory array, such as a 2D memory array.

The memory array 1410 includes multiple strings of memory cells, and each string including 32 tiers (shown as TIER0-TIER31) of charge storage transistors stacked in the Z direction, source to drain, from a source-side select gate (SGS) to a drain-side select gate (SGD). Each string of memory cells in the memory array 1410 may be arranged along the Y direction as data lines (shown as DLs), and along the X direction as pages (shown as P0-P15). Within a page, each tier represents a row of memory cells, and each string of memory cells represents a column. A block of memory cells may include a number of pages (e.g., 128 or 384). In other examples, each string of memory cells may include a different number of tiers (e.g., 8, 16, 64, or 128), and/or one or more additional tiers of semiconductor material above or below the charge storage transistors (e.g., to form select gates or data lines).

Each memory cell in the memory array 1410 includes a control gate coupled to (e.g., electrically or otherwise operatively connected to) an access line, which collectively couples the control gates across a specific tier or a portion of a tier. Specific tiers in the 3D memory array, and accordingly, specific memory cells in a string, may be accessed or controlled using respective access lines. For example, the memory array 1410 includes a first level of semiconductor material 1420 (e.g., silicon material, such as polysilicon) that couples the control gates of each memory cell in TIER31, and a second level of semiconductor material 1430 that couples the SGS of the array. Similar levels of metal or semiconductor material may couple the control gates for each tier. Specific strings of memory cells in the array may be accessed, selected, or controlled using a combination of data lines (DLs) and select gates, and specific memory cells at one or more tiers in the specific strings may be accessed, selected, or controlled using one or more access lines. In some implementations, the memory device 1210, the memory device 1302, and/or the memory device 140 may include the memory array 1410 of FIG. 14. For example, the memory array 1225 and/or the memory array 1304 may be the memory array 1410.

As indicated above, FIG. 14 is provided as an example. Other examples may differ from what is described with regard to FIG. 14.

In some implementations, a system includes a memory device; and a controller configured to: receive, from a host device and based on a user input, a command for enabling a fast bootup process for the system, wherein the fast bootup process excludes a verification of information retrieved from the memory device during the fast bootup process; enable the fast bootup process based on the command; disable a normal bootup process for the system based on the fast bootup process being enabled, wherein the normal bootup process includes a verification of information retrieved from the memory device during the normal bootup process; detect that the system has been powered on; and perform the fast bootup process based on the system being powered on.

In some implementations, a storage system includes a memory device; and a controller configured to: implement a first bootup process for the storage system based on an initial factory configuration of the storage system; receive a command for enabling a second bootup process for the storage system, wherein the second bootup process is associated with a lower boot latency as compared to the first bootup process; enable the second bootup process based on the command; disable the first bootup process based on the command; detect a power cycling associated with the storage system; and perform the second bootup process based on detecting the power cycling.

A method includes receiving, by a controller of a storage system, a command for enabling a fast bootup process for the storage system, wherein the fast bootup process excludes a measurement of information retrieved from a memory device of the storage system during the fast bootup process; enabling, by the controller, the fast bootup process based on the command; and disabling, by the controller, a normal bootup process for the storage system based on the fast bootup process being enabled, wherein the normal bootup process includes a measurement of information retrieved from the memory device during the normal bootup process.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of")

What is claimed is:

1. A system, comprising:
   a memory device; and
   a controller configured to:
      enable a fast bootup process for the system based on a fast boot counter that indicates whether to disable the fast bootup process, wherein the fast bootup process excludes a verification of information from the memory device;
      disable a normal bootup process for the system based on the fast bootup process being enabled;
      perform the fast bootup process based on the system being powered on; and
      increment the fast boot counter after the fast bootup process is performed, wherein the fast boot counter keeps a persistent count of a quantity of times the fast bootup process has been performed.

2. The system of claim 1, wherein the controller is further configured to:
   detect a change to the information;
   disable the fast bootup process based on the change to the information; and
   reenable the normal bootup process.

3. The system of claim 1, wherein the controller is further configured to:
   disable the fast bootup process for a next bootup cycle based on the fast boot counter satisfying a fast boot count threshold; and
   reenable the normal bootup process.

4. The system of claim 3, wherein the controller is further configured to:
   reenable the fast bootup process after the fast bootup process has been disabled; and
   reset the fast boot counter based on the fast bootup process being reenabled.

5. The system of claim 1, wherein the controller is further configured to:
   disable the fast bootup process based on the fast bootup process being enabled for an amount of time that satisfies a threshold amount of time; and
   reenable the normal bootup process.

6. The system of claim 1, wherein the controller is further configured to:
   receive, from a host device, a command enabling the fast bootup process, wherein the fast bootup process is enabled based on receiving the command.

7. A storage system, comprising:
   a memory device; and
   a controller configured to:
      implement a first bootup process for the storage system;
      enable a second bootup process for the storage system based on a counter that indicates whether to disable the second bootup process, wherein the second bootup process is associated with excluding verification of information from the memory device;

perform the second bootup process based on detecting a power cycling associated with the storage system; and increment the counter after the second bootup process is performed, wherein the counter keeps a persistent count of a quantity of times the second bootup process has been performed.

8. The storage system of claim 7, wherein the controller is further configured to:

receive, from a host device, a command enabling the second bootup process, wherein the second bootup process is enabled based on receiving the command.

9. The storage system of claim 8, wherein the controller is further configured to:

determine whether use of authenticated commands is enabled; and send a success response to the host device based on determining that the use of authenticated commands is enabled.

10. The storage system of claim 9, wherein the controller is further configured to:

send an error response to the host device based on determining that the use of authenticated commands is not enabled.

11. The storage system of claim 7, wherein the first bootup process is associated with determining whether measurements of a boot region correspond to reference measurements.

12. The storage system of claim 7, wherein the controller is further configured to:

reenable the second bootup process after the second bootup process has been disabled; and reset the counter based on the second bootup process being reenabled.

13. A method, comprising:

enabling, by a controller, a fast bootup process for a storage system based on a fast boot counter that indicates whether to disable the fast bootup process, wherein the fast bootup process excludes a measurement of information from a memory device of the storage system;

disabling, by the controller, a normal bootup process for the storage system based on the fast bootup process being enabled; and incrementing the fast boot counter after the fast bootup process is performed, wherein the fast boot counter keeps a persistent count of a quantity of times the fast bootup process has been performed.

14. The method of claim 13, further comprising:

updating a flag stored in a memory device of the storage system based on the fast bootup process being enabled, wherein the flag is indicative of whether the fast bootup process is enabled.

15. The method of claim 13, further comprising:

receiving, from a host device, a command enabling the fast bootup process, wherein the fast bootup process is enabled based on receiving the command.

16. The method of claim 15, further comprising:

parsing parameters of the command; and determining whether the parameters are valid, wherein enabling the fast bootup process is based on determining that the parameters are valid.

17. The method of claim 16, further comprising:

storing the parameters in a protected region of the memory device.

18. The method of claim 16, wherein an error response is sent to the host device based on the parameters being invalid parameters.

19. The method of claim 13, further comprising:

reenabling the fast bootup process after the fast bootup process has been disabled; and resetting the fast boot counter based on the fast bootup process being reenabled.

* * * * *